N. J. ROGERS.
NUT LOCK.
APPLICATION FILED JULY 6, 1909.
960,405.
Patented June 7, 1910.
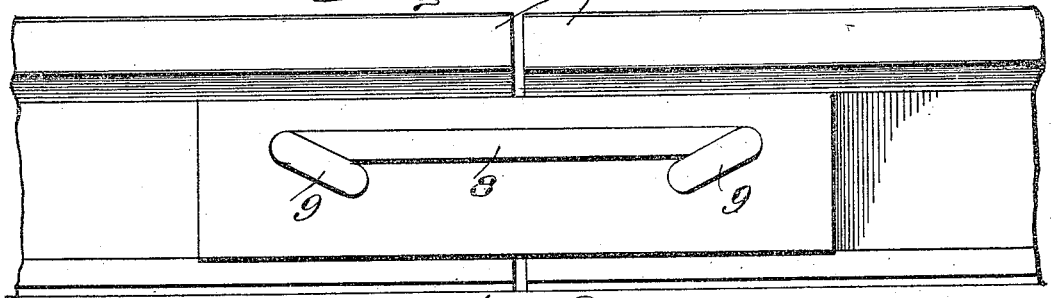
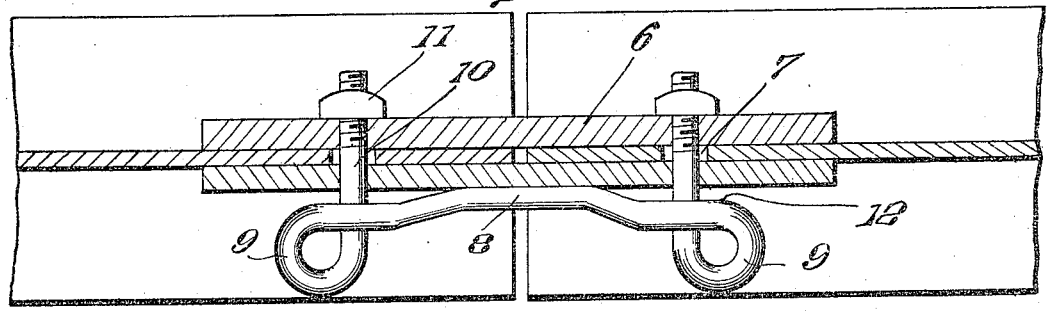
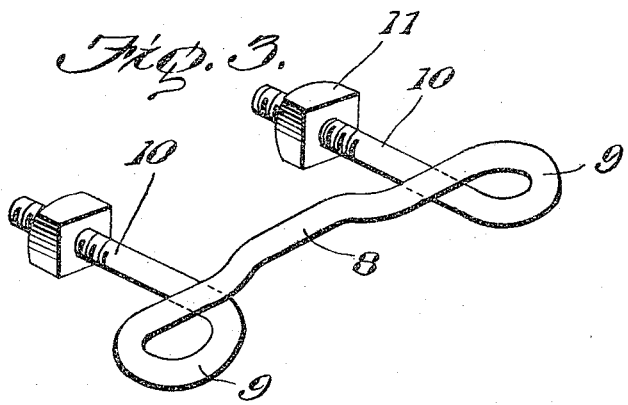
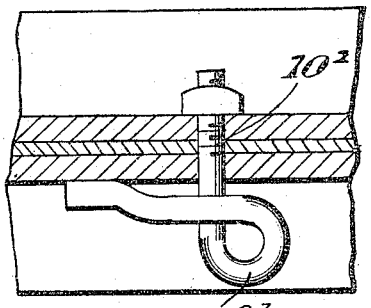
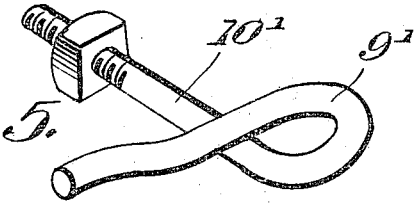
Inventor
N. J. Rogers.
Witnesses
By Attorneys

UNITED STATES PATENT OFFICE.

NATHANIEL J. ROGERS, OF TUSCALOOSA, ALABAMA.

NUT-LOCK.

960,405.  Specification of Letters Patent.  Patented June 7, 1910.

Application filed July 6, 1909. Serial No. 506,133.

*To all whom it may concern:*

Be it known that I, NATHANIEL J. ROGERS, citizen of the United States, residing at Tuscaloosa, in the county of Tuscaloosa and State of Alabama, have invented certain new and useful Improvements in Nut-Locks, of which the following is a specification.

This invention relates to nut locks and has for its object to provide a comparatively simple and inexpensive device of this character for preventing accidental rotation of nuts on the securing bolts of rail joints, incident to the passage of cars and other railway rolling stock.

A further object of the invention is to provide a nut lock including a longitudinally disposed bar or bolt having its intermediate portion bowed laterally for engagement with the adjacent fish plates and its opposite ends provided with loops or eyes terminating in threaded extensions which project through the adjacent rail sections for engagement with clamping nuts.

A further object is to provide an elastic track bolt or bar, the construction of which is such as to yieldably support the clamping nuts in contact with the fish plate, while at the same time permitting free expansion and contraction of the rails.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a front elevation of a rail joint provided with an elastic bolt or nut lock constructed in accordance with my invention; Fig. 2 is a longitudinal sectional view of the same; Fig. 3 is a perspective view of the device detached; Fig. 4 is a longitudinal sectional view partly in section of a modified form of the invention; Fig. 5 is a perspective view of the device shown in Fig. 4 detached.

Corresponding and like parts are referred to in the following description and indicated in all the views of the drawings by the same reference characters.

The nut lock forming the subject matter of the present invention is principally designed for preventing accidental rotation of the clamping bolts used on rail joints and the like and by way of illustration is shown in connection with a rail joint of the ordinary construction in which 5 designates the abutting ends of adjacent rail sections, 6 the fish plates, and 7 the bolt receiving openings extending transversely through the fish plates and webs of the rail sections.

The device comprises an elastic bolt or bar preferably circular in cross section, as shown, and having its intermediate portion bowed laterally at 8 for contact with the adjacent fish plate, and its opposite ends bent or coiled to produce loops or eyes 9 terminating in laterally extending shanks 10, which latter project through the bolt receiving openings 7 and are provided with exterior threads for engagement with suitable clamping nuts 11.

The base 12 of the loops or eyes 9 are preferably spaced from the exterior face of the adjacent fish plate so that when the nuts 11 are adjusted on the threaded shanks 10, the spring loops 9 will exert a yieldable pressure on the clamping nuts and thus force the same in engagement with the fish plate, thereby to prevent accidental rotation of the nuts incident to the passage of cars and other railway rolling stock over the track.

The intermediate bowed portion 8, by engagement with one of the fish plates, not only serves to reinforce and strengthen said fish plate at the juncture of the rail sections 5, but also has a tendency to withdraw the threaded shanks 10 from the bolt receiving openings 7 when the nuts are adjusted on the threaded portions of the shanks, this spring action being supplemented by the loops 9. It will here be noted that the intermediate bowed portion 8 intersects both shanks 10 on the upper sides thereof so as to give a torsional twist to the bar or bolt at said loops, thus permitting the shanks 10 to move slightly on the intermediate portion of the bolt or bar when the nuts are adjusted.

In using the device, threaded shanks 10 are passed through the bolt receiving openings 7 and the nuts 11 rotated with a wrench or other suitable tool until they bear against the adjacent fish plate. With the parts in this position, a further rotary movement imparted to the nuts will have a tendency to contract the loops 9 and then partially straighten out the intermediate bowed portion of the bar or bolt, thus effectually clamping the nuts against the adjacent fish plate and preventing accidental rotation of said nuts.

It will here be noted that by forming the bar with the spring loops 9, the threaded shanks 10 of the bar may be readily pressed together or apart so as to cause the shanks to register with the bolt receiving openings 7 and thus permit the device to be used on structures in which the distance between the bolt-receiving openings varies. It will also be noted that the arm or bar 8 forms a spring support or tension device for the threaded shanks and clamping nuts, while the coils or eyes form auxiliary tensioning devices for said nuts.

The device is extremely simple in construction and may be readily formed from a single length of metal thus materially reducing the cost of manufacture.

In Figs. 4 and 5 of the drawings, there is illustrated a modified form of the invention in which the bar constituting the elastic bolt is severed after the loop 9' is formed, the end of the metal forming the loop being extended laterally beyond the threaded shank 10' of the bolt for contact with the exterior face of the adjacent fish plate, as shown.

While the device is principally designed for use as a railway track bolt, it will of course be understood that the same may be used with equally good result for securing the bolts of bridge work, building constructions or wherever a device of this character is found desirable.

Having thus described the invention, what is claimed as new is:

1. The combination with a support, of a bolt having a portion thereof bearing against one side of the support and twisted to form an eye spaced from the same side of the support, and another portion thereof extended through the support and provided with exterior threads, and a clamping nut engaging the threads and bearing against the other side of the support.

2. The combination with a support, of a bolt having a portion thereof bent upon itself to form an eye normally spaced from one side of the support and thence deflected inwardly against the same side of the support, another portion of the bolt being extended through the support to form a shank having terminal threads, and a clamping nut engaging the threads on the shank and bearing against the other side of the support.

3. The combination with a support, of a bolt having a portion thereof bent upon itself to form an eye normally spaced from one side of the support and thence extended transversely across one side of the body of the bolt and bent inwardly for engagement with the same side of the support, another portion of the bolt being extended through said support to form a laterally adjustable shank provided with exterior threads, and a clamping nut engaging the threads and bearing against the other side of the support.

4. The combination with a support, of a bolt having its intermediate portion bowed laterally for engagement with one side of the support and its opposite ends bent to produce spring eyes normally spaced from the same side of the support and terminating in threaded shanks projecting through said support, and nuts engaging the threaded shanks and bearing against the other side of the support, said shanks being adjustable in parallel relation toward and from each other.

5. The combination with a support, of a bolt having its opposite end extended transversely through the support to form angularly disposed shanks adjustable laterally in parallel relation to each other and provided with exterior threads, clamping nuts engaging the threaded ends of the shanks and bearing against one side of the support, an intermediate portion of the bolt being bent to produce oppositely disposed eyes normally spaced from the opposite side of the support, that portion of the metal between the eyes being bent laterally to form a curved bearing surface for engagement with the last mentioned side of the support.

6. The combination with a support, of a bolt having its opposite ends projected through the support and provided with exterior threads for engagement with clamping nuts and its intermediate portion bent upon itself to produce oppositely disposed eyes normally spaced from one side of the support, the metal between the eyes being extended transversely across the adjacent ends of the bolt and in contact therewith and bent inwardly to form an intermediate bearing surface for engagement with the adjacent side of the support, the threaded ends of the bolt being adjustable in parallel relation toward and from each other.

7. The combination with mating rail sections having fish plates secured thereto and provided with spaced bolt receiving openings, of a bolt having its ends bent to produce angularly disposed shanks adjustable in parallel relation toward and from each other, said shanks being projected through the bolt receiving openings and provided with exterior threads, the intermediate portion of the bolt being bent upon itself to produce spring eyes normally spaced from one side of the support, the metal connecting the eyes being extended transversely across and disposed in contact with the adjacent shanks and bent inwardly between said shanks for engagement with one of the fish plates, and nuts engaging the threaded portions of the shanks and bearing against the other fish plate.

In testimony whereof I affix my signature in presence of two witnesses.

NATHANIEL J. ROGERS. [L. S.]

Witnesses:
P. S. HAY,
JOHN HANNER.